(12) United States Patent
Randecker (10) Patent No.: US 6,287,245 B1
(45) Date of Patent: Sep. 11, 2001

(54) DEEP DRILLING DEVICE

(75) Inventor: Hermann Randecker, Dettingen (DE)

(73) Assignee: TBT Tiefbohrtechnik GmbH (DE)

( * ) Notice: Subject to any disclaimer, the term of this patent is extended or adjusted under 35 U.S.C. 154(b) by 0 days.

(21) Appl. No.: 09/451,625

(22) Filed: Nov. 30, 1999

(30) Foreign Application Priority Data

Aug. 17, 1999 (DE) ................................................ 19938856

(51) Int. Cl.$^7$ ............................ B23Q 3/157; B23B 35/00
(52) U.S. Cl. ........................ 483/14; 29/26 A; 29/27 C; 408/44; 408/46; 483/31
(58) Field of Search .................................. 438/30, 31, 1, 438/16, 17, 18, 19, 36, 58, 14, 15; 409/224, 168, 136; 29/27 C, 27 R, 26 A; 408/44, 46, 43

(56) References Cited

U.S. PATENT DOCUMENTS

| | | |
|---|---|---|
| 4,115,956 | 9/1978 | Huffman . |
| 4,559,681 * | 12/1985 | Coquillart et al. ............ 29/26 A |
| 4,637,107 * | 1/1987 | Romeu ........................... 29/27 C |
| 4,655,652 * | 4/1987 | Schissler ...................... 408/44 X |
| 4,712,282 * | 12/1987 | Romeu ........................... 29/27 C |
| 4,987,668 | 1/1991 | Roesch . |
| 5,172,464 * | 12/1992 | Kitamura et al. .............. 29/563 |
| 5,351,376 * | 10/1994 | Kitamura ...................... 29/27 C |
| 5,391,850 * | 2/1995 | Mueller ...................... 408/46 UX |
| 5,759,140 * | 6/1998 | Egbert ........................... 483/1 |

FOREIGN PATENT DOCUMENTS

| | | | |
|---|---|---|---|
| 3036995 * | 4/1982 | (DE) ............................. 408/46 |
| 34 04 838 | 8/1984 | (DE) . |
| 39 07 758 | 10/1993 | (DE) . |
| 299 07 963 U1 | 7/1999 | (DE) . |
| 59-232707 * | 12/1984 | (JP) ............................. 408/46 |
| WO 96/33043 | 10/1996 | (WO) . |

* cited by examiner

*Primary Examiner*—William Briggs
(74) *Attorney, Agent, or Firm*—Akerman Senterfitt (57) ABSTRACT

A deep drilling device suitable for drilling in workpieces, particularly crankshafts, holes at different positions and/or in different orientations relative to a work longitudinal axis, has a deep drilling unit and a work holding unit cooperating therewith. The deep drilling unit permits parallel displacements of the deep drilling tools in a horizontal X direction and a vertical Y direction, as well as a tool feed parallel to the spindle axis. The tool holding device receives one or more crankshafts in such a way that their longitudinal axis is horizontally oriented and permits a rotation about the longitudinal axis and a swivelling of the workpieces about a vertical rotary axis. As a result both different tilt angles of the holes relative to the work longitudinal axis and also different positions of the holes relative to the circumference of the workpieces can be obtained.

57 Claims, 4 Drawing Sheets

DEEP DRILLING DEVICE

BACKGROUND OF THE INVENTION

The invention relates to a deep drilling device for drilling holes in workpieces, particularly crankshafts, the holes being introduceable at different positions and/or in different orientations relative to a workpiece longitudinal axis.

As is known, crankshafts for internal combustion engines for air or land vehicles, ships or stationary equipment are frequently provided with numerous holes, which are at different positions and/or in different orientations relative to the crankshaft longitudinal axis and which can e.g. serve as oil holes. During the mass manufacture of such workpieces frequently transfer lines with several work stations are used and in each work station are made in the workpiece one more holes having a specific orientation and positioning. A retooling of such transfer lines for the manufacture of workpieces, where the holes are differently positioned with respect to the orientation and/or location is complicated, time-consuming and expensive. Particularly for the production of smaller runs there has long been a need for flexibly usable devices, which are preferably also more favourable with regards to their space requirement than transfer lines.

Devices are already known, which permit a rotation of the crankshaft about its longitudinal axis and a swivelling of the longitudinal axis in order to permit the drilling of differently oriented and/or positioned holes in a specially designed deep drilling device. A device of this type involving a rotation of the crankshaft about its longitudinal axis and a unilateral swivelling of the crankshaft from a horizontal base position about a horizontal tilt axis permits holes to be made with a different orientation and/or positioning and is e.g. disclosed by international patent application WO 96/33043. The design of this installation is complicated and it has a considerable size, whilst being complicated to handle.

OBJECT OF THE INVENTION

An object of the invention is to provide a deep drilling device of the aforementioned type, which has a particularly favourable and easily monitorable construction. The handling and manipulation must be ergonomically advantageous.

SUMMARY OF THE INVENTION

A deep drilling device according to the invention has two functional units, which can in each case be constructed in a very simple and easily monitorable way and appropriately cooperate with one another. The functional units can be fitted to a common machine frame or, particularly in the case of installations for larger workpieces, on two separate machine frames. A deep drilling unit has at least one headstock with at least one main spindle rotatable by a spindle drive about a horizontal spindle axis (Z axis) for receiving a deep drilling tool displaceable parallel to the spindle axis (in the Z direction).

A work holding unit separate from the deep drilling unit has a first partial device for holding at least one workpiece with horizontally oriented workpiece longitudinal axis and for rotating the workpiece about said horizontal axis (A axis). A second partial device rotates the workpiece, particularly of the first partial device, about a vertical rotation axis (B axis). Thus, the workpiece holding unit has all the functions necessary for swivelling the workpiece and as a result of rotations about the A axis different circumferential portions of the workpiece can face the deep drilling tool and by rotations about the B axis it is possible to set different tilt angles of the holes relative to the workpiece longitudinal axis. Particularly in the case of installations for larger workpieces, to avoid excessively large axial movements it is also possible to make the tool-carrying parts of the deep drilling unit swivellable about a vertical axis (B2 axis).

For the relative displacement of workpiece and deep drilling tool there are also first, second and third positioning devices, in order to permit parallel displacements between the workpiece and the deep drilling tool relative to orthogonal axes. The first positioning device brings about displacements parallel to a horizontal, first axis (X axis), said displacements serving to introduce holes at different positions along the longitudinal axis of the horizontally held workpiece. The X axis is generally perpendicular to the spindle axis, but can also be positioned transversely thereto, e.g. in the case of constructions with a horizontally swivellable spindle axis. The displacements possible as a result of the second positioning device parallel to a vertical, second axis (Y axis) at right angles to the spindle axis can serve to set a lateral offset of a hole relative to the workpiece longitudinal axis. The displacements parallel to a third axis (W axis) made possible by the third positioning device can be used for changing the spacing or distance between the workpiece and the deep drilling tool, in order e.g. prior to the drilling process, to engage the deep drilling tool or an optionally present tool guide on the tool-facing work surface. The W axis is generally parallel to the spindle axis, but can also be at an acute angle thereto, e.g. in the case of constructions with a horizontally swivellable spindle axis.

Preferably the headstock is part of a tool carrier device having as a further element a tool guidance device axially offset relative to the headstock for guiding the deep drilling tool and an associated tool displacement device for moving the deep drilling tool relative to the tool guidance device parallel to the spindle axis.

The construction according to the invention in which the workpiece, independently of the rotation angle about the vertical B axis has its workpiece longitudinal axis always substantially horizontally oriented, has numerous major advantages. Thus, e.g. the deep drilling unit can be a standard deep drilling unit, which e.g. already contains the first and second positioning devices for the displacement in the X and Y directions. If necessary, existing deep drilling units with a swivelling possibility for the spindle axis about a vertical B2 axis can be used. The work holding unit can be built up using a rotary table already existing in more modern deep drilling centres and which is usable as part of the second partial device for rotating the workpiece about the B axis. The rotary table can be movable horizontally parallel or at an acute angle to the spindle axis, in order to permit a spacing change between the workpiece and the deep drilling unit. The basic design of inventive installations can consequently take place inexpensively using appropriately combined, existing partial installations.

As a result of the exclusively horizontal retention of the workpieces it is possible to have a vertically relatively compact construction without highly projecting parts, which reduces the vibration susceptibility of the installation and consequently increases drilling precision. For an optionally desired multiple machining, in which e.g. two or more crankshafts are simultaneously machined in the same way, the workpieces can be readily superimposed. For loading and unloading purposes the work holding unit can be rotated or moved into a loading position by means of the second partial device, in which the work longitudinal axes are e.g. roughly parallel to the spindle axis and in which an easy horizontal, lateral loading and unloading can take place. These processes can be particularly easily automated by means of corresponding loading and unloading units. However, in particular, these processes can also be easily manually performed, because the possibly heavy and long crankshafts, etc. only have to be horizontally held and do not have to be rendered upright or inclined. The ergonomics are consequently improved compared with existing installations.

The horizontal retention of the workpieces also makes it possible in simple manner for them, based on the spindle axis direction, to be swivelled into two opposing horizontal directions. Starting from a base position in which the spindle axis is perpendicular to the work longitudinal axis and in which e.g. radially oriented holes can be made, it is easily possible to tilt the holes towards both longitudinal ends of the workpieces. This obviates the need for the rechucking of the workpieces necessary in conventional means, which permits significant productivity improvements.

Although it is possible to design e.g. as a linear guide of the deep drillingunit the third positioning device for changing the spacing between the deep drilling unit and work holding unit, according to a preferred embodiment the third positioning device is associated with the work holding unit. It can have a third linear guidance device for guiding the work holding unit relative to the machine frame of the deep drilling device positioned parallel to the spindle axis or to the spindle axis fundamental orientation. It is then possible to use a simple construction of the deep drilling unit, which only has guidance devices in the X and Y directions, but not for the displacement of the tool carrier device as a whole substantially parallel to the spindle axis. Within the scope of the invention it is also possible to associate the first and/or second positioning device with the work holding unit, in that e.g. a corresponding linear guide is provided for the horizontal transverse displacement of the rotary table perpendicular to the spindle axis and/or for vertical displacement perpendicular to the spindle axis.

A further development is characterized in that the deep drilling unit has a device for rotating the spindle axis or a preferably provided tool carrier device about a vertical rotation axis (B1 axis). The resulting possible horizontal swivelling of the deep drilling tool and the components carrying it is particularly advantageous if holes are to be drilled which are tilted very considerable against the work longitudinal axis, because for the setting of the necessary inclinations both the workpieces and the tools can be swivelled, so that extreme rotation positions of the work carrier can be avoided.

In order to be able to adapt the preferably provided work guides, generally known as drill bushes or bushings, to the particular work or crankshaft contours and/or in order to be able to adapt them to different drilling tool diameters, it is possible to have a tool guide changer for the automatic changing of the tool guides on the tool guidance unit. A pickup magazine or a disk or chain magazine of the tool guide changer can be associated with the work holding unit and can in particular be fixed thereon and therefore movable therewith e.g. parallel to the spindle axis. This permits a drill bushing change when the tool guidance device is stationary in the spindle axis direction, in that the tool guidance device and the tool guide changer are oriented axially towards one another and can then be brought up to one another for drill bushing change purposes by moving the work holding unit.

It is also possible to provide on the tool guidance device movable, particularly linearly movable groups of tool guides or drill bushings, which can e.g. be placed on a common carrier or support. For drill bushing change purposes it is then only necessary to move the carrier in such a way that the desired bushings are located in the vicinity of the spindle axis. A preferred, triple linear changer for a two-spindle device will be described in greater detail relative to embodiments.

There is appropriately also a tool changer for the automatic extraction and insertion of deep drilling tools on the main spindle. The tool changer can e.g. be fitted in the form of a tool pickup magazine in fixed manner to the machine frame of the deep drilling device. Following a corresponding axial orientation of the headstock and magazine, e.g. by displacing the tool carrier device in the X direction, the tool change can be carried out whilst moving the headstock in the spindle axis direction. Appropriately the tool guide changers and the tool changer are so constructed and positioned that a replacement of deep drilling tools and associated tool guides can be simultaneously performed and for this purpose the devices can be arranged with a corresponding axial spacing and with a corresponding height.

Since as a rule through-holes have to be produced, according to a preferred embodiment a sealing device is provided for sealing passage points of deep drilling tools when drilling the workpiece. This makes it possible to prevent coolant, mixed with drill chips, being squirted out on the side remote from the tool when the drill breaks through, leading to a dirtying of equipment and in certain circumstances allowing the drill to run dry, which could lead to premature drill wear.

According to a further development, a particularly reliable seal is obtainable in that a sealing device is provided for sealing an axial work portion, e.g. a main or lift bearing, has at least one sealing dish in the sealing portion pressable onto a work circumferential surface by means of a peripheral portion, which gives rise to a large-area seal also able to withstand high drilling oil pressures. On the work-facing side the sealing dish can be made from plastic into which drilling can take place. Preferably there are several sealing dishes for each sealing portion, which leads to an uninterrupted seal in the peripheral direction and which only leaves free the tool entrance area.

A particularly high flexibility and good adaptability to different crankshaft geometries can be achieved in that sealing devices for different diameters and/or axial lengths of sealing portions can be interchangeably fitted to the work carrier device, fitting preferably taking place axially at random locations. This is e.g. possible in that the sealing devices are so designed, that they are only hung in holding profiles parallel to the work longitudinal axis and can be locked thereto.

Particularly when drilling sloping holes, at the transition between the hole and the work circumferential surface narrow material burrs can form in certain circumstances and following the hardening of the crankshafts can become so brittle that they can tear off the crankshaft in operation, giving rise to considerable motor damage. To avoid this risk, it is consequently appropriate to rework the entrance and exit areas of holes e.g. by countersinking, which is conventionally performed in separate countersinking stations. However, preferred deep drilling devices according to the invention are characterized in that they have an integrated hole finish machining device for machining the end regions, i.e. the entrance and/or exit areas of holes at the work circumferential surface. This can obviate the need for separate countersinking stations and the numerical details for the hole can also be used for the finish machining of the hole end areas. This increases productivity. In connection with devices according to the invention the term "countersinking" not only covers conventional countersinking with a countersink, whose centre diameter is larger than the hole diameter, but also the use of circular cutters, which e.g. run over the curved, elliptical marginal region of sloping holes in the circumferential direction and thereby deburr the same. Preferably the hole finish machining device has at least one countersinking sleeve with at least one countersink movable parallel to the spindle axis and which can preferably be driven by its own drive. The countersinking sleeve can be fixed to a tool guide carrier or drill bushing carrier and/or can be movable therewith transversely to the spindle axis. To avoid mutual deterioration of the drill bushing and countersinking device it can be both horizontally and vertically offset with respect to the associated drill bushing. The countersinking sleeve moves the countersink from the waiting position outside the collision area into the working position at the workpiece. The machining feed of the countersink takes place by moving the workpiece along the W axis.

In cases where it is desired to seal one end of a finished through-hole, it is also possible to provide a hole sealing or closing device, which is preferably constructed in such a way that initially, e.g. by a drilling process using a larger drilling tool a diameter widening of limited depth of an end portion of a hole is produced, then a preferably spherical, metallic closure member is inserted in the diameter widening and subsequently the closure member is fixed in said widening, in that e.g. in a caulking process the workpiece material surrounding the ball is plastically deformed accompanied by the jamming of the ball.

It is known that the drilling aids used during deep drilling can be harmful if they are introduced into the following work stations following a machining operation. It is therefore appropriate to clean the finish machined workpieces and this is normally carried out in separate cleaning stations. A preferred further development is characterized in that it has an integrated cleaning device for freeing the workpieces from solid and liquid machining residues. It has proved particularly advantageous to carry out cleaning without extraneous cleaning agents such as liquid detergents or the like. The cleaning device is therefore preferably constructed as a centrifugal device, where cleaning can take place without aids using centrifugal forces. Appropriately for this purpose the rotary drive provided for rotating the workpieces about their longitudinal axis is constructed in such a way that it is possible to achieve rotational speeds of e.g. more than 500 revolutions per minute, particularly between approximately 800 and approximately 1700 r.p.m. Such dry cleaned workpieces are generally substantially free from chips and at the most have a very thin residual drilling oil film, which is not harmful in the following devices.

To increase the productivity of the deep drilling device, according to a preferred embodiment the work holding unit is constructed for the simultaneous reception of several, particularly two, simultaneously machinable workpieces, which are preferably superimposed in axially parallel manner. Preferably for each workpiece there is an independent, separately controllable rotary drive. The construction can in particular be modular and for each workpiece can be provided a complete and independently functional module, which has a rotary drive, clamping means optionally clamping aids and optionally sealing devices and the like.

Correspondingly an associated headstock can have several, particularly two superimposed, axially parallel main spindles or there can be several superimposed headstocks. A corresponding tool guidance device can have several, particularly two, four, six or eight, etc. axially parallel, superimposed tool guides. As a result of the appropriate superimposing of workpieces, drill bushings, tools and spindles with respect to multiple machining a productivity increase for the device is readily achievable, without it being necessary to modify horizontal structural dimensions compared with individual machining devices or without having to add to the existing construction area on the machine frame.

Further features and details of the invention can be gathered from the following description of a preferred embodiment in conjunction with the drawings and subclaims. The individual features, either singly or in subcombination, can be implemented in an embodiment. An embodiment of the invention is described in greater detail hereinafter relative to the drawings, wherein show:

DETAILED DESCRIPTION OF A PREFERRED EMBODIMENT

Figure 1:
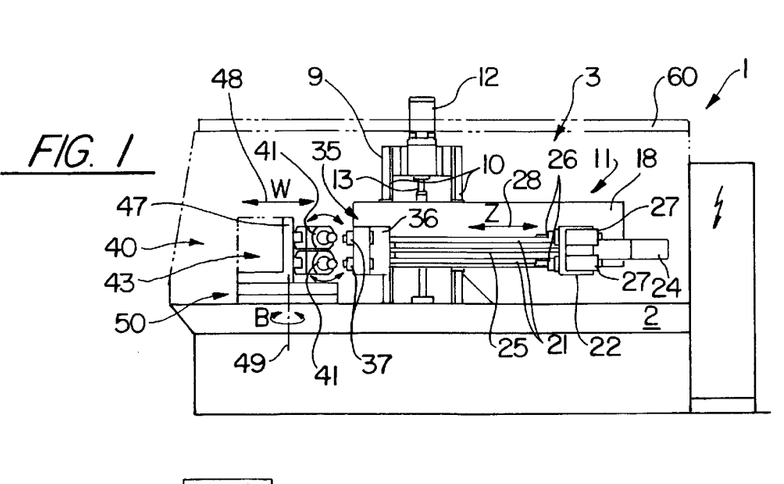
FIG. 1 A diagrammatic side view of an embodiment of an inventive deep drilling device.
Figure 2:
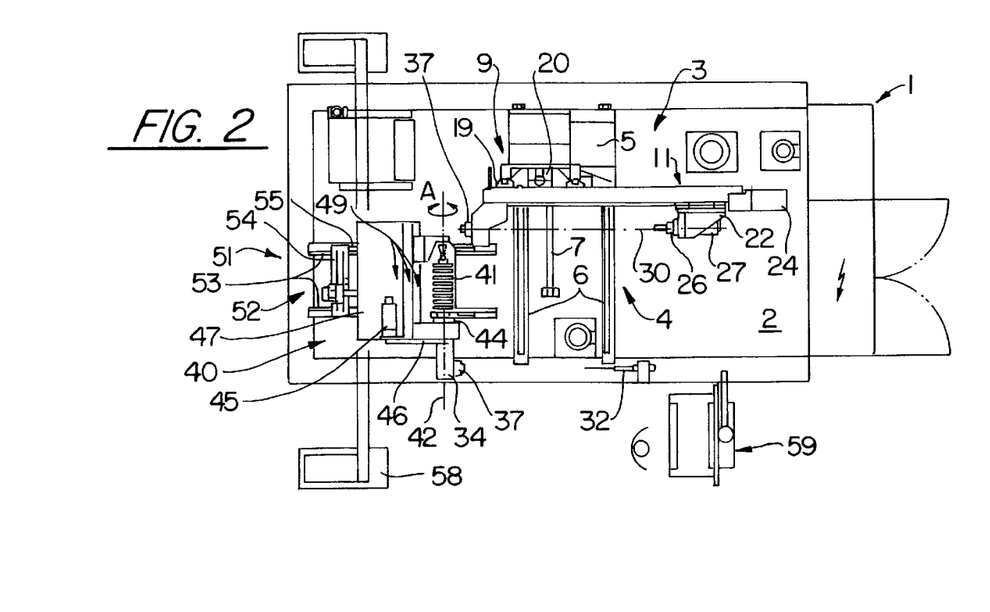
FIG. 2 A plan view of the deep drilling device of FIG. 1.
Figure 3:
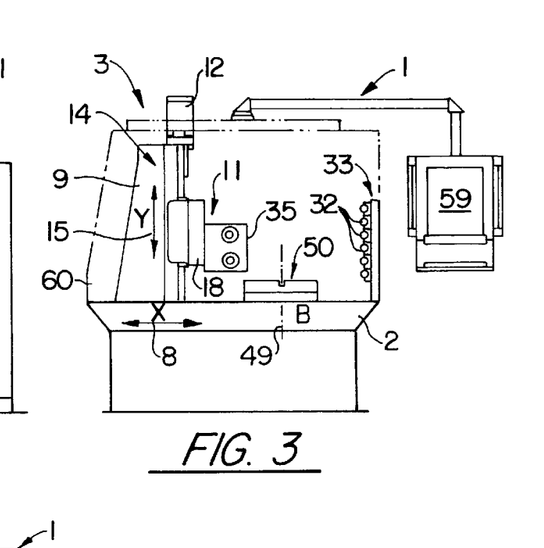
FIG. 3 A front view of the deep drilling device of FIGS. 1 and 2.

The embodiment of an inventive deep drilling unit 1 shown in FIGS. 1 to 3 is based on a standard deep drilling centre, in which a deep drilling unit 3 is fixed to the top of a machine bed 2. The unit 3 has a first positioning device 4 with a cross-slide 5 slidably guided on two axially parallel linear guide rails 6 and by means of a not shown, first NC drive motor can be moved by means of a first spindle drive 7 parallel to a horizontal, first axis 8 (X axis).

On the cross-slide is located a column 9 with a pair of vertically oriented, axially parallel linear guide rails 10, on which is vertically movably guided a tool carrier device 11. For raising and lowering the tool carrier device 11 is provided a NC motor, e.g. a servomotor 12 placed on the top of the column and whose motor axis is parallel to the axes of the linear guides 10 and which acts by means of a vertical, second spindle drive 13 positioned between the guide rails 10 on the back of the tool carrier device 11. This provides a simply constructed, second positioning device 14 for the vertical displacement of the tool carrier device 11 parallel to a vertical, second axis 15, known as the Y axis.

The tool carrier device 11 incorporates a horizontally elongated carrier or support 18 constructed in the form of a vertical plate and on whose column-facing back are provided guidance elements 19 for acting on the linear guides 10, as well as a spindle nut 20 for cooperating with the vertical, second spindle 13. On the facing front is horizontally provided a linear guide with two axially parallel guide rails 21 on which is guided in linearly movable manner a headstock 22. For moving the headstock along the linear guide 21 parallel to the horizontal Z axis 28 is provided a further NC servomotor 24, which acts by means of a horizontal threaded spindle 25 on a thread drive nut on the bottom of the headstock.

In the headstock 22 are arranged in spaced, superimposed manner two axially parallel main spindles 26 and for each of said spindles is provided on the headstock a separately controllable, electromotive spindle drive 27 for rotating the main spindle about a horizontal spindle axis 30. On the drive-remote side each of the main spindles has a quick-action chuck for receiving a deep drilling tool 32. There are also constructions with only one spindle or with more than two spindles.

In the represented operating position of the deep drilling device no deep drilling tools are clamped. Some deep drilling tools are arranged in axially parallel, superimposed manner in a subsequently described changing magazine 33, which is positioned laterally alongside the tool carrier device on a vertical carrier plate at the edge of the machine bed.

For guiding the deep drilling tools clamped in the particular main spindles before, during and after a drilling process a tool guidance device 35 is provided, which on the end opposite to the feed drive 24 is firmly fitted to the carrier plate 18 and has a drill bush or bushing carrier 36 for receiving replaceable or interchangeable drill bushings or tool guides 37.

The described, preferred deep drilling unit makes it possible by tool movements at right angles to one another parallel to the X or Y axis to displace in parallel the tools in order to take up a machining position perpendicular to the tool longitudinal axis. By displacing the headstock towards the tool guidance device 35 or away from the latter an axial displacement of the tool in the Z axis direction is possible. This work feed of the deep drilling tool is possible without it being necessary to displace larger masses of the deep drilling unit, e.g. the tool carrier device as a whole. The machining feed takes place by linear displacement of the headstock, i.e. by a Z axis 28 associated with the tool.

For holding or retaining the workpieces to be drilled and for the correct orientation of the workpieces with respect to the tool or spindle axis a work holding unit 40 is provided, which in the represented embodiment carries two crankshafts 41, whose longitudinal axes 42 are oriented horizontally and parallel to one another. The work holding unit essentially has two functionally cooperating partial devices. A first partial device 43 is used for holding workpieces with horizontally oriented work longitudinal axis and for rotating workpieces about the work longitudinal axis known as the A axis. In the represented embodiment, for this purpose the crankshafts 41 are received in chucks 44, which are rotatable by a swivel drive 45 e.g. by means of a toothed belt or a chain or a spur gear. For each crankshaft is provided a separate drive controllable independently of the other motor. On the opposite side the workpieces can be mounted on centres or in chucks. The described elements are fixed to the vertical legs of a cross-sectionally L-shaped carrier 47, which is fixed to a rotary table 50 clearly visible in FIG. 3 and which forms part of a second partial device of the work holding unit and which is rotatable about a vertical rotation axis 49, hereinafter also B axis. Through the use of an optionally already present rotary table of a deep drilling device, it is possible to valorize conventional deep drilling devices appropriately and inexpensively to a deep drilling device according to the invention, in that a suitable, first partial device is fixed to the rotary table.

The rotary table is displaceable by means of a third positioning device 51 parallel to a third or W axis 48, which is oriented parallel to the spindle axis 30. For this purpose the rotary table is placed on a third linear guidance device 52, which comprises two horizontally positioned guide rails, which are axially parallel and fixed to the machine bed and on which the rotary table base is guided in linearly displaceable manner. For moving the crankshaft clamping device in the W direction a drive motor 54 is provided, which rotates a threaded spindle 55, on which runs a nut fixed to the bottom of the rotary table.

Random space angles are possible by superimposing rotations about the A axis 42 and B axis 49. By rotating about the vertical B axis different tilt angles of the holes relative to the work axes are set, whereas by rotating about the A axis different positions with respect to the circumference of a workpiece can be set. The longitudinal axes 42 of the workpieces remain horizontal in all angular settings.

By a parallel displacement of the tools in the X direction different positions along the work longitudinal axis can be set, whereas parallel displacements in the vertical Y direction can be used, diverging from a radial direction to the longitudinal axis, for drilling a hole laterally offset with respect to the longitudinal axis. Thus, by right-angled movements in the tool, the necessary machining positions can be achieved.

By moving the work holding unit 40 by motor 54 parallel to the W axis the workpiece can be moved against the drill bushing 37 fixed in the W or Z direction. By movements in the W direction it is also possible to perform compensation movements, which are necessary by the swivelling of the workpieces about the vertical B axis if the tools are horizontally displaced against the vertical B axis.

The machining feed for deepening a hole or for extracting a tool from the hole appropriately takes place through the Z axis associated with the tool, in that the headstock is moved relative to the tool guidance device and appropriately the drill bushing is in fixed engagement on the work side facing the tool.

A method for drilling holes, which are to be made at different positions and/or in different orientations relative to the longitudinal axis of the workpieces can be carried out as follows. The deep drilling unit is set up in such a way that the deep drilling tools are fixed in main spindles and drilling bushings adapted to the deep drilling tools and the work geometry are incorporated into the tool guidance device 37. For clamping the crankshafts in the work holding unit the rotary table by feeding in the W direction can be brought level with a loading gantry 58 positioned laterally alongside the machine frame. The rotary table can be rotated into a loading position, in which the clamping elements for the workpieces face the loading gantry, i.e. in a loading position turned by approximately 90° to the orientation shown. Following the clamping of the crankshafts they are rotated by the B axis drive and the swivel drives 45 into a first working position corresponding to the orientation of the first of the holes to be made. By displacing the tool carrier in the X and/or Y direction there is a move up to the correct position of the tools. Subsequently by moving the rotary table in the direction of the W axis the work contours are pressed onto the fixed drill bushings. With the spindle drive switched on the headstock is then advanced by means of the feed drive 24 and consequently the tool carried by it is introduced through the guide bushing into the workpiece and to the intended depth. The tool is then retracted. Subsequently the rotary table can be retracted, so that as a result of rotations about the B axis and/or A axis a new work orientation relative to the tool can be achieved. Simultaneously or in deferred manner with respect to said swivelling, by movements of tools in the X and/or Y direction it is possible to move up to the new tool position. The described process is now initiated for the new holes.

Figure 6:
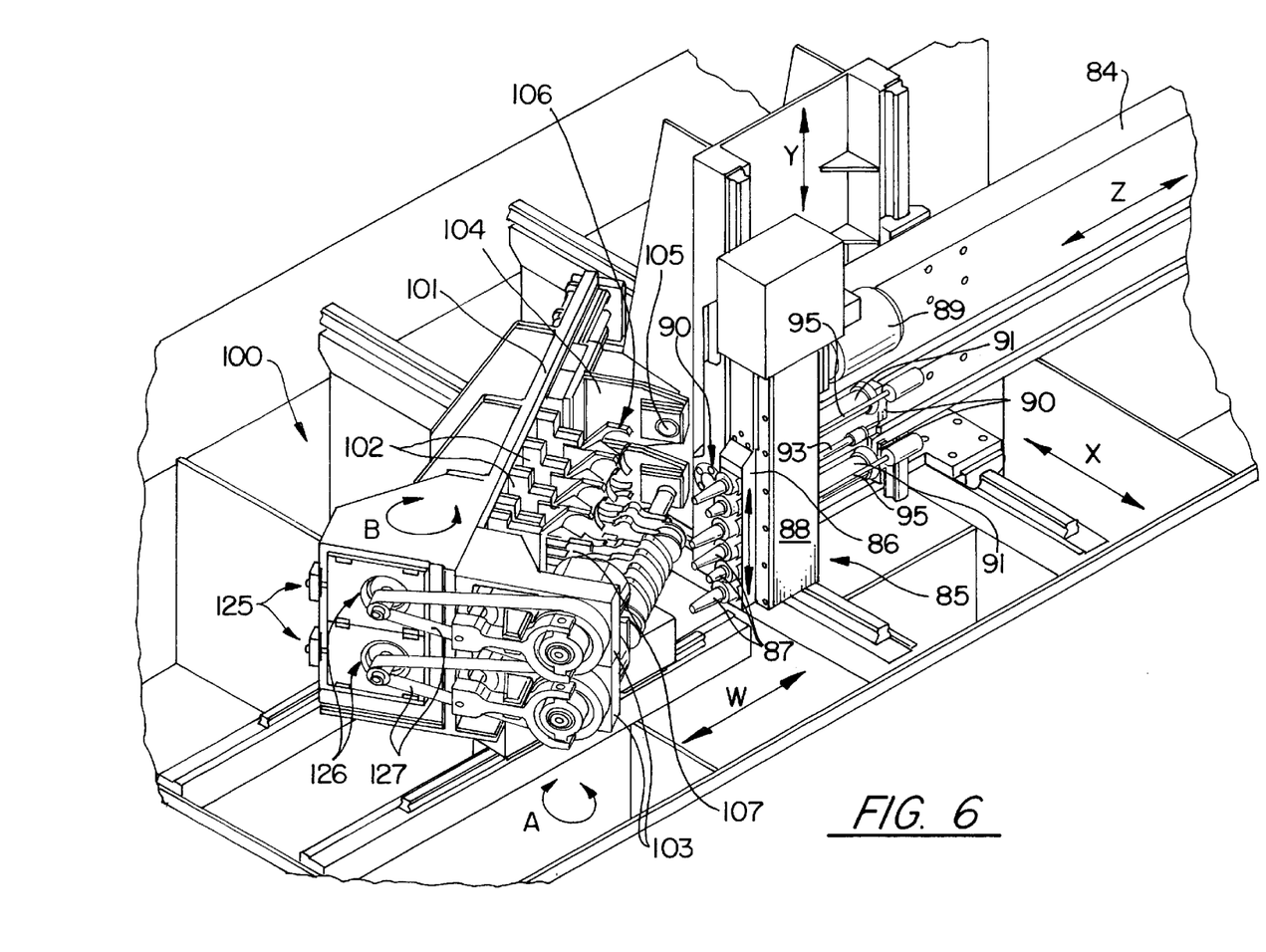
FIG. 6 A sloping perspective partial view of a preferred variant of a tool carrier device with a triple linear drill bushing changer and an integrated countersink with countersinking sleeves combined with a preferred embodiment of a work holding unit with separately drivable rotary devices for crankshafts and having devices for setting up the crankshafts and for sealing drilling points.
Figure 7:
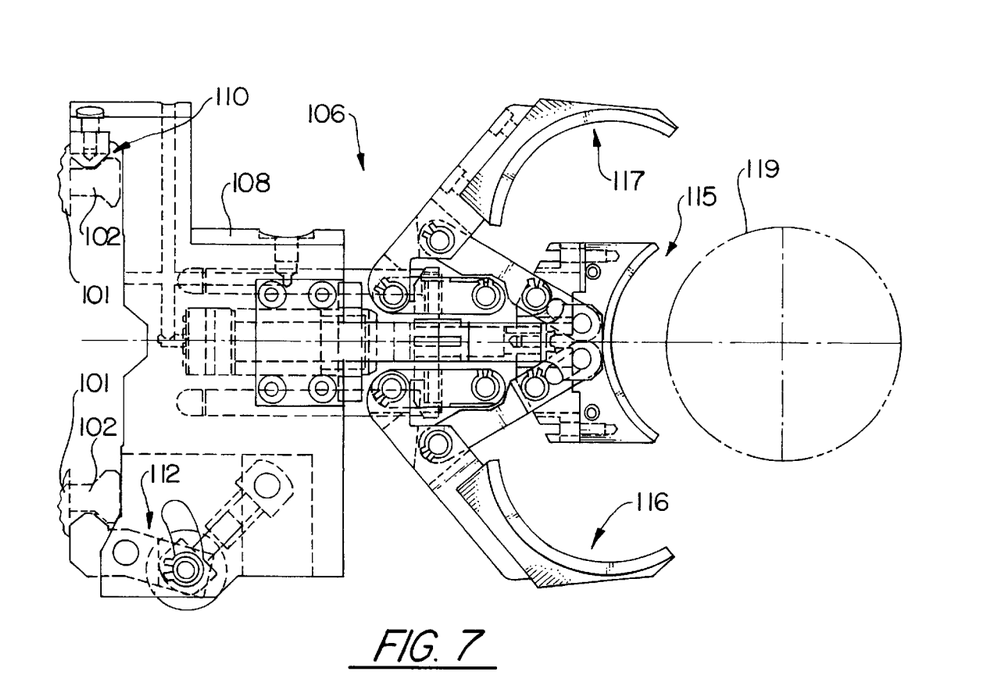
FIG. 7 A side view of an replaceable sealing device, which can be fitted to the work holding unit according to FIG. 6.
Figure 8:
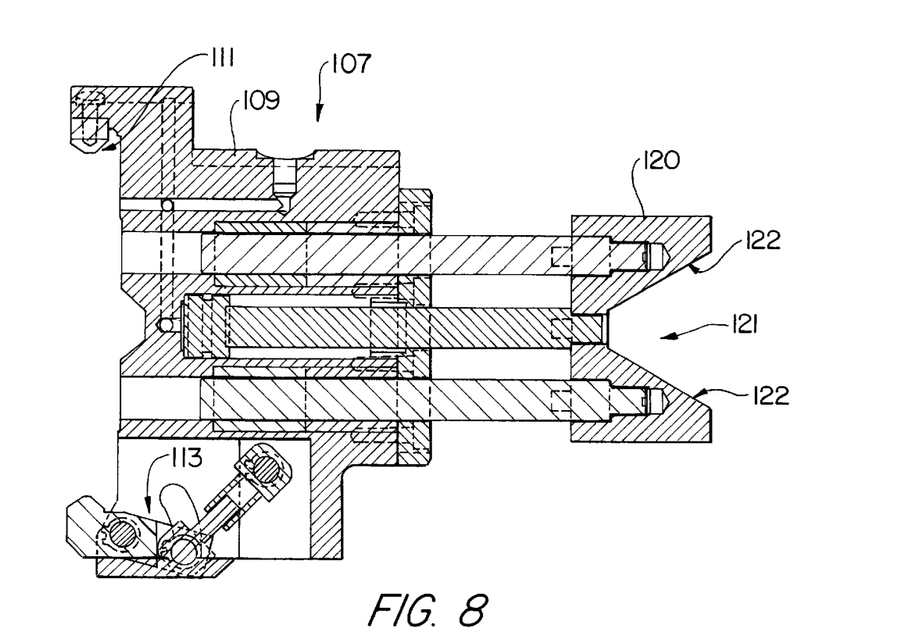
FIG. 8 A side view of a device, replaceably fittable to the work holding unit of FIG. 6, for the radial orientation of crankshafts prior to clamping in the work holding unit of FIG. 6.

On the partial device 43 can be provided additional devices to be described in conjunction with FIGS. 6 to 8, e.g. orienting devices for the precise angular position of the crankshaft during machining and/or drilling auxiliary devices, e.g. a sealing device, which in the case of through-holes seals the drill break-through point on the work back, so that coolant, mixed with drilling chips does not squirt out on the opposite side when the drill breaks through, so as to dirty the equipment and possibly allow the drill to run dry, which could lead to premature drill wear.

So as to permit a reliable engagement contact between the drill bushing and workpiece, appropriately there are drill bushings adapted to the particular crankshaft contours. If it is necessary to drill holes having different diameters, appropriately correspondingly different dimensioned deep drilling tools and drill bushings adapted to the tool diameters are provided. A tool change and optionally a drill bushing change to be carried out can be performed simultaneously and automatically in the embodiment shown. For this purpose the automatic drill bushing changer 33 is located alongside the deep drilling unit 1 and a drill bushing changer 34 is provided on the work holding unit 40. Whereas the tool changer 33 is fixed, the tool guide changer 34 is fixed to the carrier 47 of the work holding unit and is movable therewith in the W direction. For the simultaneous changing of deep drilling tools and matching drill bushings, the turntable is retracted until a transverse displacement of the column 9 is possible without contacting the work holding unit or workpieces held therein. The headstock is linearly moved into the maximum retraction position shown in the drawings. The column is then moved laterally to such an extent that the spindle axis is coaxial to the axis of a tool 32 to be introduced and held in the holding device 33. In this position the drill bushings to be changed are also oriented with one another and a bushing change can be carried out by corresponding manipulations, the rotary table being movable in the W direction. The tool change can optionally be carried out simultaneously, accompanied by the displacement of the headstock and corresponding manipulations in the main spindle. Following the tool and drill bushing change, which can obviously also be carried out separately, the described operating process can be performed for making new holes. Another drill bushing change possibility will be described in conjunction with FIG. 6.

The very easily monitorable, simple and compactly constructed deep drilling device, which can e.g. with the deep drilling unit 4 and rotary table 5 use essential components of modern deep drilling centres, facilitates a flexible drilling of workpieces, particularly crankshafts with high productivity and precision. All the drives for moving the oppositely displaceable and rotatable elements are appropriately controlled in computer-assisted manner by a numerical control. In the installation shown this control means is housed in a console 59 placed alongside the installation. As a result of the NC control the processes during drilling and between the drilling processes can be completely automated. The NC control can also be set up in such a way that the manipulations for removing and inserting workpieces can be substantially automated. It is correspondingly possible with the described or a corresponding hardware by means of suitable control programs to create the most varied hole geometries and distributions on workpieces, particularly crankshafts. The compact construction makes it possible to house all the movable components of the device within a compactly dimensioned protective cover 60, which can have openings closable by doors or the like on the side facing the loading gantry 58 e.g. for working on the deep drilling device.

Figure 4:
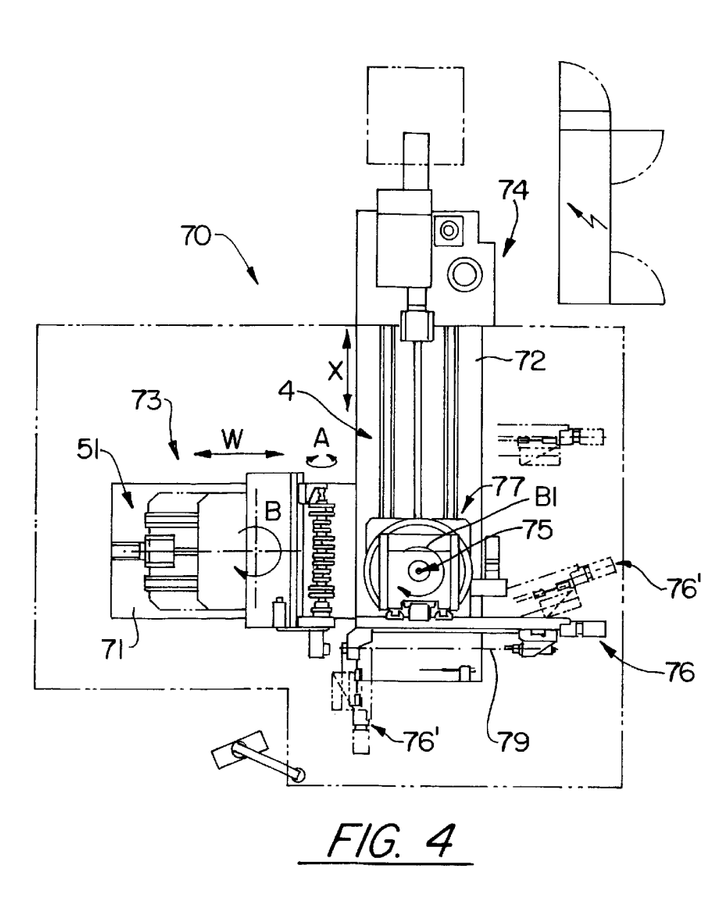
FIG. 4 A plan view of another deep drilling device with separate machine frames for the deep drilling unit and work holding unit.
Figure 5:
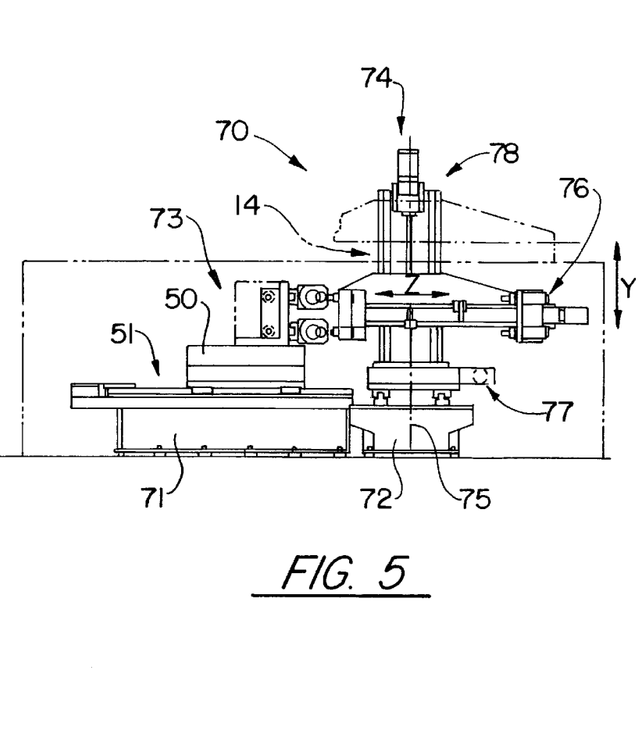
FIG. 5 A side view of the embodiment of FIG. 4.

FIGS. 4 and 5 show another embodiment of a deep drilling device 70 where, for ease of reference purposes, some corresponding elements are given the same reference numerals as in FIGS. 1 to 3. Whereas the embodiment of FIGS. 1 to 3 is preferably intended for crankshafts no longer than about 850 to 900 mm, the embodiment according to FIGS. 4 and 5 is particularly optimized for longer workpieces, e.g. with lengths up to approximately 1500 mm. Such long crankshafts are mainly used in stationary diesel engines, as well as in marine diesels or commercial vehicles.

There are essentially two differences. Whereas in the first embodiment the deep drilling unit and work holding unit are mounted on a common machine bed 2 with a compact arrangement, in the embodiment according to FIGS. 4 and 5 there are separate machine frames 71 and 72 for the work holding unit 73 and deep drilling unit 74. Following an e.g. L-shaped erection, said machine frames can be e.g. fixed to one another by screws, so that there is a stable substrate for the overall device.

In addition, other than in the embodiment according to FIGS. 1 to 3, on the deep drilling unit is provided an additional, vertical rotary axis (B1 axis 75), which permits a horizontal swivelling of the tool carrier device 76. For this purpose there is a rotary table 77 linearly movable on the linear guide rails of the first positioning device 4 and whose base is guided on the guide rails 6 and whose top carries the column 78 with the second positioning device 14 (vertical displacement parallel to the Y axis). This in particular permits a swivelling of the tool carrier device 76 in such a way that it is swivelled from a base position in which the spindle axis 79 is parallel to the W axis 48 of the work holding unit into the position 76' shown in broken line form in FIG. 4, where the spindle axis is at an acute angle of 20° to the W axis. A swivelling in the opposite direction is also possible.

The second, vertical rotary axis 75 associated with the tool makes it possible to implement larger tilt angles of the holes relative to the radial direction, without in the necessary inclination of the spindle axis 79 relative to the work longitudinal axis 42 the workpiece having to be swivelled to such an extent about the vertical axis 49 of the workpiece that in particular the end regions of the work carrier device project in interfering manner into the movement area of the column 78 or the tool carrier device 76. The longer the horizontally swivelled workpieces the greater this problem. If at least part of the necessary tilt angle results from a swivelling of the spindle axis about the vertical axis 75, this interference contour problem can be avoided, because a swivelling about the B axis 49 must only provide the corresponding residual angle and correspondingly the swivelling need be less pronounced than for unswivelled spindles.

FIG. 6 inter alia shows the work-facing end region of a particularly preferred embodiment of a tool carrier device 84, on which is provided as the tool guidance device 85 a drill bushing changer in the form of a triple linear changer. The latter has a carrier 86 vertically displaceable on a linear guide and to which are fitted in the spacing of the two spindle axes and in superimposed manner two groups of in each case three pairwise identical drill bushings 87. In the vertical arrangement direction the first and fourth, second and fifth and third and sixth bushings are in each case identical. The linear guide for the carrier 86 is fixed to the front of a vertically elongated, box or bin-shaped chip collecting container 88, on whose top is provided the drive for the linear displacement of the drill bushing carrier 88 enclosed by a box-shaped casing. The collecting device 88 which is open on its underside is horizontally traversed during the drilling process by the drilling tools 95 and on the drill bushing-remote back there are sealed guides for the tools. Thus, pressurized drilling oil, which is used for flushing chips out of the drill hole and for cooling the drilling tool, is forced back along an axial groove of the single-lip drilling tools 95 back into the collecting container and is not squirted out from the latter and instead runs downwards into a suitable collecting tank. If the drill bushings 87 are changed when replacing different drilling tools, in the represented triple linear changer case it is only necessary to have a common linear displacement of the drilling bushes in order to arrange the desired pair of bushes level with the spindle axes. For this purpose beforehand the tools are retracted at least into the chip bin 88 or are themselves replaced on changing the drilling diameter.

This embodiment not only permits an easy drill bushing change and a substantially contamination-free operation, but also a countersinking of the hole end regions directly at the deep drilling machine without rechucking the workpieces. For this purpose the countersink 90 is provided, which has two countersinking sleeves 91 superimposed with the vertical spacing of the spindle axes. The parallel countersinking sleeves are jointly vertically adjustable by a vertical displacement of the tool carrier device 84 and can be driven in rotary manner by their own, common drive 89, which if necessary can be coupled to the countersinks. The horizontal feed takes place hydraulically by means of a not shown hydraulic piston, to whose piston rod 93 are fixed the linearly guided tool units of the countersink. The countersinking sleeves are laterally and vertically offset against the spindle axes, so that in the retracted state they do not impede the drilling process and the possibly necessary swivelling movements. For countersinking purposes the sleeves are initially arranged coaxially with the holes to be machined and subsequently the countersinks are moved up to the workpiece by sleeve feed. The machining feed, in which the rotating countersinks penetrate the workpiece, is brought about by moving the workpieces along the W axis.

The preferred embodiment of a partial device 100 for the horizontal clamping and rotation of workpieces shown in FIG. 6 has a carrier plate 101 corresponding to the L-shaped carrier of the device 43 and to whose tool-facing front are fixed four superimposed, horizontal profile rails 102 behind which engagement can take place from the tool side. To these can be replaceably fitted all units desired for the construction of the partial device. They permit the fitting of units at any random axial position, so that it is possible to adapt the partial device 100 to any desired crankshaft geometry in a simple manner. At the end facing the observer are fixed in superimposed manner two identical bearing parts 103, which carry on their insides not shown chucks for the workpieces. At the opposite end are provided stay bearings in the form of tailstocks 104 with bearing centres 105 for fixing the rotation axis of the crankshafts. Between the axial end bearings 103, 104, a number of replaceable sealing devices 106 (cf. FIG. 7) are hung on the profile rails 102 and locked thereto, said number corresponding to the number of bearing points to be machined. A hydraulically operable orienting device 107 is also hung in and locked and is shown in detail in FIG. 8. The visible devices 103 to 107 are used for the manipulation and machining of the not shown, upper crankshaft. Among the devices 106, 107 identical devices for the lower crankshaft are fixed to the two lower profile rails in interchangeable manner.

For each workpiece to be clamped is provided a separate, independently controllable rotary drive 125 for the workpiece rotation about the A axis and in the represented embodiment comprises a servomotor 126 fixed to the carrier 101 and which by means of a toothed belt 127 acts on the rotary mounted chuck. The servomotors are designed for work rotations or revolutions of up to approximately 1700 r.p.m., so that optionally a cleaning of the workpieces is possible by centrifuging drilling oil and chips. The independent drives encourage the advantageous, modular construction of the partial device, which can easily be retooled for different workpiece numbers. It is also possible to achieve an individual setting of the correct rotary position for each workpiece, which is particularly advantageous when setting takes place by means of measuring probes.

As can be easily seen in FIGS. 7 and 8, each of the replaceable devices 106, 107 has an axially narrow main casting 108 or 109 with downwardly projecting holding fingers 110 or 111 at the upper end and suspended in an upper reception groove of the in each case upper profile rail. At the opposite lower end is provided a swivellable locking lever 112 or 113 which, after suspending the holding fingers in the upper rail and applying the main casting to the front of the holding profiles engages in a reception groove on the underside of the in each case lower guide rail and in this way fixes the device in wobble-free, unlosable manner to the profiles 102. This manner of fixing permits a fitting of said devices at random, optionally continuously adjustable axial positions along the guide profiles. The adaptation of the device to differently dimensioned crankshafts is consequently very easy.

The sealing device 106 (FIG. 7) has three sealing dishes 115, 116, 117 fitted to a common toggle lever mechanism and in each case covering a circumferential angle of approximately 110° and are provided with plastic coatings on the cylindrically curved, work-facing surfaces. The toggle lever mechanism is designed in such a way that in the case of a hydraulic feed of the central dish 115 in the direction of the workpiece portion to be sealed (bearing 119) the outer dishes 116, 117 arranged symmetrically to the central dish are placed round the workpiece portion to be sealed for forming an almost uninterrupted sealing ring, so that only on the side opposite to the dish 115 is there a gap for the passage of the drilling tool. As a result of this all-round seal it is possible to reliably prevent an escape of pressurized drilling fluid when the drilling tool breaks through. The latter only penetrates a certain amount into the soft coating of the dish 115. Thus, it is possible to reliably prevent an escape of drilling fluid and consequently a dirtying of the drilling area and optionally a running dry of the drilling tools.

The hydraulically operable orienting device 107 of FIG. 8 is used on clamping the workpieces, in order to ensure the correct rotary or radial position of the workpiece. It has a support member 120, which can be moved hydraulically and horizontally forwards and backwards with a work-facing, trapezoidal recess 121, which is bounded by prismatic support faces 122. On clamping a crankshaft the latter is initially axially clamped between a centre 105 on the bearing block or pedestal 104 and the facing chuck, without the latter radially clamping and retaining the workpiece. Only subsequently does the radial fixing of the workpiece or the setting of the correct rotary position about the work longitudinal axis take place in that the support member is pressed onto a suitable lift bearing of the crankshaft. The correct rotary position is reached when the circumference of the lift bearing engages on the two opposite support faces 122. Then, by operating the chuck, the workpiece is radially clamped and can now be machined. Fixing by means of such orienting elements is particularly advantageous for larger runs, where for each crankshaft and shaft geometry it is necessary to provide suitably dimensioned and designed orienting elements. For smaller runs, to increase the flexibility of the device it is possible to work with measuring probes, which can e.g. be fitted to the deep drilling unit.

The devices shown in FIGS. 6 to 8 can be provided in all inventive deep drilling devices, e.g. according to FIGS. 1 to 3 and 4/5 either in part or in entirety.

In particular the sealing device, an integrated drill finish machining device, a hole closing device and the integration of a cleaning device into the deep drilling device are measures which, independently of an exclusively horizontal orientation of the workpieces to be machined, can be advantageous in the case of other deep drilling devices of the described type. They permit a complete machining, e.g. of oil channels in a single work station and therefore give rise to considerable space saving advantages and productivity increases compared with the prior art.

What is claimed is:

1. Deep drilling device for drilling holes in workpieces in which the holes can be drilled at different positions and in different orientations relative to a work longitudinal axis, comprising:

a deep drilling unit with at least one headstock, which has at least one main spindle rotatable by a spindle drive about a horizontal spindle axis for the reception of a deep drilling tool, the deep drilling tool being displaceable parallel to the spindle axis;

a work holding unit with first rotation means for holding at least one workpiece with horizontally oriented work longitudinal axis and for rotating the workpiece about a vertical rotation axis;

a first positioning device for relative displacement of workpiece and deep drilling tool parallel to a horizontal, first axis (X axis) at right angles to the spindle axis;

a second positioning device for relative displacement of the workpiece and the deep drilling tool parallel to a vertical, second axis (Y axis) perpendicular to the spindle axis;

and a third positioning device for relative displacement of the workpiece and the deep drilling tool parallel to a third axis (W axis) parallel or at an acute angle to the spindle axis; and the second rotation means being adapted for rotating the workpiece about the vertical rotation axis into and out of a loading or unloading position for horizontally loading or unloading the workpiece into or out of the work holding unit.

2. Deep drilling device according to claim 1, wherein the deep drilling unit has at least one tool carrier device with at least one headstock and wherein the tool carrier device has a tool guidance device associated with the headstock for guiding the tool, as well as a tool displacement device for moving the deep drilling tool relative to the tool guidance device parallel to the spindle axis.

3. Deep drilling device according to claim 1, wherein the second rotation means of the work holding unit has a rotary table with a vertical rotation axis, which is movable parallel or at an acute angle to the spindle axis.

4. Deep drilling device according to claim 1, wherein the third positioning device is associated with the work holding unit, the third positioning device having a third linear guidance device oriented parallel or in an acute angle to the spindle axis for guiding the work holding unit relative to a frame of the deep drilling device.

5. Deep drilling device according to claim 1, wherein the first positioning device and the second positioning device are associated with the deep drilling unit, in which the first positioning device has a first linear guidance device directed horizontally transversely to the spindle axis; and the second positioning device has a second linear guidance device directed vertically perpendicular to the spindle axis for guiding the tool carrier device relative to a frame of the deep drilling device.

6. Deep drilling device according to claim 1, wherein the first positioning device is fixed to the frame and the second positioning device is movably guided on the first positioning device.

7. Deep drilling device according to claim 1, wherein the deep drilling unit has no positioning device for the displacement of the tool carrier device parallel or at an acute angle to the spindle axis.

8. Deep drilling device according to claim 1, wherein the deep drilling unit has a device for rotating the spindle axis, particularly a tool carrier device, about a vertical rotation axis.

9. Deep drilling device according to claim 1, further comprising a frame for carrying the deep drilling unit and a separate, further frame for carrying the work holding unit.

10. Deep drilling device according to claim 1, wherein the deep drilling unit has a device for rotating the spindle axis about a vertical rotation axis and wherein the device for rotating the spindle axis about a vertical rotation axis and the second rotation means are constructed such that the spindle axis and the workpiece, starting from a base position in which the work longitudinal axis is oriented perpendicular to the spindle axis, are horizontally swivellable against one another in two opposite directions.

11. Deep drilling device according to claim 1, further comprising a tool guide changer for the automatic replacement of the tool guides of the tool guidance device.

12. Deep drilling device according to claim 11, wherein the tool guide changer is associated with the work holding unit and is fixed thereon and movable therewith and has a magazine for tool guides.

13. Deep drilling device according to claim 11, wherein the tool guidance device has at least one linearly movably mounted tool guidance carrier with several tool guides associated with a spindle axis and replaceable by moving the tool guidance carrier.

14. Deep drilling device according to claim 11, wherein the tool guidance device has a collecting device for the splash-protected collection of liquid drilling aids.

15. Deep drilling device according to claim 14, wherein the tool guidance device includes at least one closed drill bushing carrier.

16. Deep drilling device according to claim 1, wherein a tool changer for automatic changing of deep drilling tools is provided on the main spindle, the tool changer being associated with the deep drilling unit, being fixed to the frame and being rendered accessible by a movement of the tool carrier device.

17. Deep drilling device according to claim 11, wherein the tool guide changer and the tool changer are arranged and cooperate for simultaneous changing of the deep drilling tools and associated ones of the tool guides.

18. Deep drilling device according to claim 1, further comprising at least one sealing device for sealing passage points of deep drilling tools on side of the workpiece remote from the deep drilling tool.

19. Deep drilling device according to claim 18, wherein the sealing device has at least one sealing dish in a sealing portion pressable onto a work circumferential surface by means of a circumferential portion.

20. Deep drilling device according to claim 19, wherein for one sealing portion there are several sealing dishes for a substantially uninterrupted sealing of the sealing portion along the work circumference.

21. Deep drilling device according to claim 19, wherein the sealing device is provided to be replaceably fitted to the work carrier device.

22. Deep drilling device according to claim 1, further comprising an integrated drill and machining device for machining of mouth-areas of the holes on the work circumferential surface.

23. Deep drilling device according to claim 22, wherein the end machining device has at least one countersinking sleeve with at least one countersink movable parallel to the spindle axis.

24. Deep drilling device according to claim 23, wherein the countersinking sleeve is fixed to a tool guidance device.

25. Deep drilling device according to claim 23, wherein the countersinking sleeve is movable with the tool guidance device transversely to the spindle axis.

26. Deep drilling device according to claim 1, wherein there is an integrated device for preparing a closure of the hole.

27. Deep drilling device according to claim 26, wherein the integrated device includes means for widening the diameter of a hole end portion, means for inserting a closure member into the widened hole and means for fixing the closure member in the hole.

28. Deep drilling device according to claim 1, further comprising an integrated cleaning device for removing machining residues from workpieces.

29. Deep drilling device according to claim 28, wherein the cleaning device is a centrifugal device and includes a rotary drive for rotating the workpiece about its work longitudinal axis at speeds of more than 500 r.p.m.

30. Deep drilling device according to claim 1, wherein the work holding unit includes holding means for the simultaneous reception of several workpieces.

31. Deep drilling device according to claim 30, wherein the holding means are provided to hold at least two workpieces in superimposed manner with parallel work longitudinal axes.

32. Deep drilling device according to claim 30, wherein a separately controllable rotary drive is provided for each workpiece.

33. Deep drilling device according to claim 1, wherein several main spindles arranged in axially parallel, superimposed manner are provided and wherein the tool guidance device has several tool guides arranged in axially parallel, superimposed manner.

34. Deep drilling device according to claim 1, wherein the workpieces are crankshafts.

35. Deep drilling device for drilling holes in workpieces in which the holes can be drilled at different positions and in different orientations relative to a work longitudinal axis, comprising:
- a deep drilling unit with at least one headstock which has at least one main spindle rotatable by a spindle drive about a horizontal spindle axis for the reception of a deep drilling tool, the deep drilling tool being displaceable parallel to the spindle axis;
- a work holding unit with first rotation means for holding at least one workpiece and for rotating the workpiece about the work longitudinal axis and second rotation means for rotating the workpiece about a rotation axis perpendicular to the work longitudinal axis;
- a first positioning device for relative displacement of workpiece and deep drilling tool parallel to a horizontal, first axis (X axis) at right angles to the spindle axis;
- a second positioning device for relative displacement of the workpiece and the deep drilling tool parallel to a vertical, second axis (Y axis) perpendicular to the spindle axis;
- a third positioning device for relative displacement of the workpiece and the deep drilling tool parallel to a third axis (W axis) parallel or at an acute angle to the spindle axis; and
- a device for rotating the spindle axis about a vertical rotation axis.

36. Deep drilling device according to claim 35, wherein the device for rotating the spindle axis is adapted for rotating the tool carrier device about a vertical rotation axis.

37. Deep drilling device according to claim 35, wherein the device for rotating the spindle axis about a vertical rotation axis comprises a rotary table linearly movable along guide rails of the first positioning device and carrying the second positioning device.

38. Deep drilling device according to claim 35, wherein the second rotation means are adapted for rotating the workpiece about a vertical rotation axis and wherein the device for rotating the spindle axis about a vertical rotation axis and the second rotation means are constructed such that the spindle axis and the workpiece, starting from a base position in which the work longitudinal axis is oriented perpendicular to the spindle axis, are horizontally swivellable against one another in two opposite directions.

39. Deep drilling device according to claim 35, wherein the first rotation means are adapted for holding at least one workpiece with a horizontally oriented work longitudinal axis and wherein the second rotation means are adapted for rotating the workpiece about a vertical rotation axis.

40. Deep drilling device for drilling holes in workpieces in which the holes can be drilled at different positions and in different orientations relative to a work longitudinal axis, comprising:
- a deep drilling unit with at least one headstock which has at least one main spindle rotatable by a spindle drive about a horizontal spindle axis for the reception of a deep drilling tool, the deep drilling tool being displaceable parallel to the spindle axis;
- a work holding unit with first rotation means for holding at least one workpiece and for rotating the workpiece about the work longitudinal axis and second rotation means for rotating the workpiece about a rotation axis perpendicular to the work longitudinal axis;
- a first positioning device for relative displacement of workpiece and deep drilling tool parallel to a horizontal, first axis (X axis) at right angles to the spindle axis;

a second positioning device for relative displacement of the workpiece and the deep drilling tool parallel to a vertical, second axis (Y axis) perpendicular to the spindle axis;

a third positioning device for relative displacement of the workpiece and the deep drilling toQ1 parallel to a third axis (W axis) parallel or at an acute angle to the spindle axis; and at least one sealing device for sealing passage points of deep drilling tools on the side of the workpiece remote from the deep drilling tool.

41. Deep drilling device according to claim 40, wherein the sealing device has at least one sealing dish in a sealing portion pressable onto a work circumferential surface by means of a circumferential portion.

42. Deep drilling device according to claim 40, wherein for a sealing portion there are several sealing dishes for a substantially uninterrupted sealing of the sealing portion along the work circumference.

43. Deep drilling device according to claim 40, wherein the sealing device is provided to be replaceably fitted to the work carrier device.

44. Deep drilling device according to claim 40, wherein the first rotation means are adapted for holding the at least one workpiece with a horizontally oriented work longitudinal axis and wherein the second rotation means are adapted for rotating the workpiece about a vertical rotation axis.

45. Deep drilling device for drilling holes in workpieces in which the holes can be drilled at different positions and in different orientations relative to a work longitudinal axis, comprising:

a deep drilling unit with at least one headstock which has at least one main spindle rotatable by a spindle drive about a horizontal spindle axis for the reception of a deep drilling tool, the deep drilling tool being displaceable parallel to the spindle axis;

a work holding unit with first rotation means for holding at least one workpiece and for rotating the workpiece about the work longitudinal axis and second rotation means for rotating the workpiece about a rotation axis perpendicular to the work longitudinal axis;

a first positioning device for relative displacement of workpiece and deep drilling device tool parallel to a horizontal, first axis (X axis) at right angles to the spindle axis;

a second positioning device for relative displacement of the workpiece and the deep drilling tool parallel to a vertical, second axis (Y axis) perpendicular to the spindle axis;

a third positioning device for relative displacement of the workpiece and the deep drilling tool parallel to a third axis (W axis) parallel or at an acute angle to the spindle axis; and an integrated drill end machining device for machining of mouth-areas of the holes on the work circumferential surface, wherein the end machining device has at least one countersinking sleeve with at least one countersink movable parallel to the spindle axis.

46. Deep drilling device according to claim 45, wherein the countersinking sleeve is fixed to a tool guidance device.

47. Deep drilling device according to claim 45, wherein the countersinking sleeve is movable with the tool guidance device transversely to the spindle axis.

48. Deep drilling device according to claim 45, wherein the first rotation means are adapted for holding the at least one workpiece with a horizontally oriented work longitudinal axis and wherein the second rotation means are adapted for rotating the workpiece about a vertical rotation axis.

49. Deep drilling device for drilling holes in workpieces in which the holes can be drilled at different positions and in different orientations relative to a work longitudinal axis, comprising:

a deep drilling unit with at least one headstock which has at least one main spindle rotatable by a spindle drive about a horizontal spindle axis for the reception of a deep drilling tool, the deep drilling tool being displaceable parallel to the spindle axis;

a work unit with first rotation means for holding at least one workpiece and for rotating the workpiece about the work longitudinal axis and second rotation means for rotating the workpiece about a rotation axis perpendicular to the work longitudinal axis;

a first positioning device for relative displacement of workpiece and deep drilling tool parallel to a horizontal, first axis (X axis) at right angles to the spindle axis;

a second positioning device for relative displacement of the workpiece and the deep drilling tool parallel to a vertical, second axis (Y axis) perpendicular to the spindle axis;

a third positioning device for relative displacement of the workpiece and the deep drilling tool parallel to a third axis (W axis) parallel or at an acute angle to the spindle axis; and the deep drilling device further comprising an integrated device for preparing a closure of the hole.

50. Deep drilling device according to claim 49, wherein the integrated device for preparing a closure of the hole includes means for widening a diameter of the hole, means for inserting a closure member into the widened hole and means for fixing the closure member in the hole.

51. Deep drilling device according to claim 49, wherein the first rotation means are adapted for holding the at least one workpiece with a horizontally oriented work longitudinal axis and wherein the second rotation means are adapted for rotating the workpiece about a vertical rotation axis.

52. Deep drilling device for drilling holes in workpieces in which the holes can be drilled at different positions and in different orientations relative to a work longitudinal axis, comprising:

a deep drilling unit with at least one headstock which has at least one main spindle rotatable by a spindle drive about a horizontal spindle axis for the reception of a deep drilling tool, the deep drilling tool being displaceable parallel to the spindle axis;

a work holding unit with first rotation means for holding at least one workpiece and for rotating the workpiece about the work longitudinal axis and second rotation means for rotating the workpiece about a rotation axis perpendicular to the work longitudinal axis;

a first positioning device for relative displacement of workpiece and deep drilling tool parallel to a horizontal, first axis (X axis) at right angles to the spindle axis;

a second positioning device for relative displacement of the workpiece and the deep drilling tool parallel to a vertical, second axis (Y axis) perpendicular to the spindle axis;

a third positioning device for relative displacement of the workpiece and the deep drilling tool parallel to a third axis (W axis) parallel or at an acute angle to the spindle axis; and the deep drilling device further comprising an integrated cleaning device for removing machining residues from workpieces, wherein the cleaning device is a centrifugal device and includes a rotary drive for rotating the workpiece about the work longitudinal axis at speeds sufficient for removing machining residues by centrifugal forces.

53. Deep drilling device according to claim 52, wherein the rotary drive for rotating the workpiece about its work longitudinal axis is adapted for rotations at speed of more than 500 r.p.m.

54. Deep drilling device according to claim 52, wherein the first rotation means are adapted for holding the at least one workpiece with a horizontally oriented work longitudinal axis and wherein the second rotation means are adapted for rotating the workpiece about a vertical rotation axis.

55. Deep drilling device for drilling holes in workpieces in which the holes can be drilled at different positions and in different orientations relative to a work longitudinal axis, comprising:

a deep drilling unit with at least one headstock which has at least one main spindle rotatable by a spindle drive about a horizontal spindle axis for the reception of a deep drilling tool, the deep drilling tool being displaceable parallel to the spindle axis;

a work holding unit with first rotation means for holding at least one workpiece and for rotating the workpiece about the work longitudinal axis and second rotation means for rotating the workpiece about a rotation axis perpendicular to the work longitudinal axis;

a first positioning device for relative displacement of workpiece and deep drilling tool parallel to a horizontal, first axis (X axis) at right angles to the spindle axis;

a second positioning device for relative displacement of the workpiece and the deep drilling tool parallel to a vertical, second axis (Y axis) perpendicular to the spindle axis;

a third positioning device for relative displacement of the workpiece and the deep drilling tool parallel to a third axis (W axis) parallel or at an acute angle to the spindle axis; and a collecting device for collecting pressurized drilling oil and drilling chips, the collecting device comprising a sealed guide means for each deep drilling tool and being constructed such that pressurized drilling oil used for flushing chips out of drill holes and for cooling the drilling tool is forced into the collecting device, thereby preventing contamination of the environment with drilling oil and chips on the tool side of the deep drilling device.

56. Deep drilling device according to claim 55, wherein the second guide means includes at least one closed drill bushing carrier.

57. Deep drilling device according to claim 55, wherein the first rotation means are adapted for holding the at least one workpiece with a horizontally oriented work longitudinal axis and wherein the second rotation means are adapted for rotating the workpiece about a vertical rotation axis.

\* \* \* \* \*